US012263531B2

(12) United States Patent
Zoller

(10) Patent No.: US 12,263,531 B2
(45) Date of Patent: Apr. 1, 2025

(54) OPTICAL MEASURING AND/OR PRESETTING METHOD AND OPTICAL TOOL PRESETTING AND/OR TOOL MEASURING APPARATUS

(71) Applicant: E. ZOLLER GMBH & CO. KG EINSTELL- UND MESSGERAETE, Pleidelsheim (DE)

(72) Inventor: Alexander Zoller, Pleidelsheim (DE)

(73) Assignee: E. ZOLLER GMBH & CO. KG EINSTELL- UND MESSGERAETE, Pleidelsheim (DE)

( * ) Notice: Subject to any disclaimer, the term of this patent is extended or adjusted under 35 U.S.C. 154(b) by 986 days.

(21) Appl. No.: 17/327,296

(22) Filed: May 21, 2021

(65) Prior Publication Data
US 2021/0370420 A1 Dec. 2, 2021

(30) Foreign Application Priority Data
May 27, 2020 (DE) ..................... 10 2020 114 158.0

(51) Int. Cl.
*B23C 9/00* (2006.01)
*G01B 11/24* (2006.01)

(52) U.S. Cl.
CPC ................ *B23C 9/00* (2013.01); *G01B 11/24* (2013.01)

(58) Field of Classification Search
CPC ....... B23C 9/00; G01B 11/24; G01B 11/2433; B23Q 17/0919; B23Q 17/2457; G05B 2219/37227; G05B 19/401; G05B 19/4065
See application file for complete search history.

(56) References Cited

U.S. PATENT DOCUMENTS

| 2013/0268109 A1* | 10/2013 | Chang ................... G05B 19/41 700/187 |
| 2018/0143611 A1 | 5/2018 | Wenke et al. |
| 2020/0230760 A1 | 7/2020 | Kasahara et al. |
| 2023/0204344 A1* | 6/2023 | Nozais ............. G05B 19/41875 702/155 |

FOREIGN PATENT DOCUMENTS

| DE | 102012106139 A1 | 1/2014 |
| DE | 102015105999 A1 | 10/2016 |
| DE | 102018127178 A1 | 4/2020 |
| WO | WO-2019066058 A1 | 4/2019 |

* cited by examiner

*Primary Examiner* — Mohammad Ali
*Assistant Examiner* — Sheela Rao
(74) *Attorney, Agent, or Firm* — Perry + Currier Inc.

(57) ABSTRACT

An optical measuring and/or presetting method for a combined measuring and/or presetting of a set of profile machining tools comprises a plurality of individual profile machining tools is proposed, wherein the individual profile machining tools of the set of profile machining tools are configured for a successive machining of side edges of stone slabs, with at least one tool presetting and/or tool measuring apparatus, by means of which in at least one first tool measuring step an at least partly and/or at least section-wise concave-curved work contour, in particular milling contour or polishing contour, of a first profile machining tool of the set of profile machining tools is optically captured in an at least semi-automated manner, wherein in a first tool presetting step profile coordinates are assigned to the work contour of the first profile machining tool captured in the first tool measuring step, said profile coordinates being stored in a memory unit of the tool presetting and/or tool measuring apparatus.

23 Claims, 5 Drawing Sheets

Figure 1:
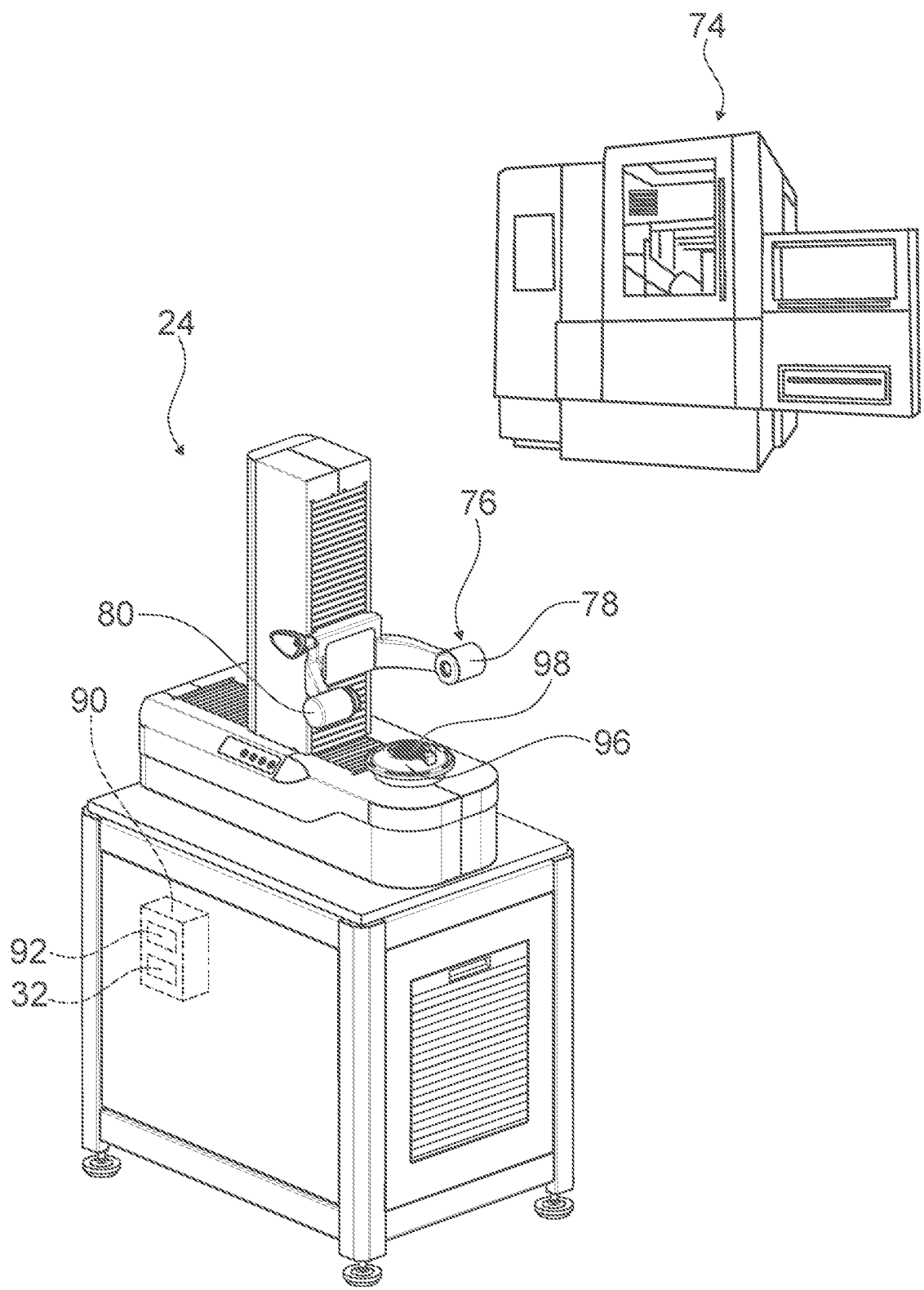

OPTICAL MEASURING AND/OR PRESETTING METHOD AND OPTICAL TOOL PRESETTING AND/OR TOOL MEASURING APPARATUS

STATE OF THE ART

The invention relates to an optical measuring and/or presetting method according to claim 1 and to an optical tool presetting and/or tool measuring apparatus according to claim 23.

In the industry of stone masonry, when producing edge profiles, e. g. of kitchen or washstand plates made of stone, manual and thus fault-prone and time-consuming presetting of machining tools is carried out down to the present day.

The objective of the invention is in particular to provide a generic method with advantageous characteristics regarding a precision and/or regarding a speed of an edge machining of stone slabs. The objective is achieved according to the invention by the features of patent claims 1 and 23 while advantageous implementations and further developments of the invention may be gathered from the subclaims.

ADVANTAGES OF THE INVENTION

An optical measuring and/or presetting method is proposed, for a combined measuring and/or presetting of a set of profile machining tools comprising a plurality of individual profile machining tools, in particular a plurality of profile milling tools and/or profile polishing tools, preferably a plurality of profiling wheels and/or profile polishing wheels, wherein the individual profile machining tools of the set of profile machining tools are configured for a successive machining of side edges of stone slabs, with at least one tool presetting and/or tool measuring apparatus, by means of which in at least one first tool measuring step an at least partly and/or at least section-wise concave-curved work contour, in particular milling contour or polishing contour, of a first profile machining tool of the set of profile machining tools is optically captured in an at least semi-automated, preferably fully automated, manner, wherein in a first tool presetting step profile coordinates are assigned to the work contour of the first profile machining tool captured in the first tool measuring step, said profile coordinates being in particular calculated by a computing unit of the tool presetting and/or tool measuring apparatus which comprises a processor, and being stored in a memory unit of the tool presetting and/or tool measuring apparatus.

In this way a high degree of precision, in particular of a stone slab machining step following the tool measuring step and/or the tool presetting step, is advantageously achievable. Advantageously this enables a machining of a stone slab with an especially high accuracy. It is moreover advantageously possible to speed up the entire stone slab machining process, for example as a measuring of the profile machining tools, in particular of the respectively following profile machining tool, can be executed while the stone slab is already being machined. Advantageously, downtimes of machine tools are reducible. Beyond this a lifetime of the profile machining tools can advantageously be maximized by a high presetting precision of profile machining tools. It is advantageously possible to reduce costs, in particular costs per item.

By a "combined measuring and/or presetting" is in particular, in this context, a measuring and/or presetting to be understood in which at least the presetting values determined for different profile machining tools are aligned with one another. In particular, herein a determined measuring value and/or a determined presetting value of a profile machining tool that has been measured first will be used as a basis for a measuring and/or a determination of the presetting value of a subsequently measured profile machining tool. The set of profile machining tools in particular comprises at least two, preferably at least three, advantageously at least five, preferentially at least seven and especially preferentially no more than ten profile machining tools. Preferably a first portion of the profile machining tools of the set of profile machining tools are implemented as a profile milling tool, in particular as a profiling wheel, while a further portion of the profile machining tools of the set of profile machining tools are implemented as a profile polishing tool, in particular as a profile polishing wheel. In particular, the profile machining tool, preferably the profiling wheel and/or the profile polishing wheel, comprises a machining surface, preferably a milling surface or a polishing surface, extending around a circumference of the profile machining tool, which in particular runs around a tool rotation axis of the profile machining tool. In particular, the machining surface, preferably the milling surface or the polishing surface, forms a shape, in particular the work contour, which at least substantially corresponds to the desired edge shape of the machined stone slab. The stone slab is in particular embodied as a kitchen stone slab or as a washstand stone slab, or something like that. A "successive machining of a side edge" is in particular to mean individually subsequent machining of the same side edge executed by different profile machining tools.

By a "tool presetting and/or tool measuring apparatus" is in particular an apparatus to be understood which is at least configured for at least partly capturing and/or presetting at least a length, at least an angle, at least a contour and/or at least an outer shape of a tool, in particular relative to a tool holder. By a "partly concave-curved contour" is in particular a contour to be understood which is concavely curved, in particular inwards-curved, at least in a subregion of the contour. By a "section-wise concave-curved contour" is in particular a contour to be understood which is curved concavely, in particular inwards-curved, at least in a subsection of the contour. A (partial) surface of a body or a (partial) contour of an outer contour of a body is in particular curved concavely if an imaginary straight line between arbitrarily selectable points of said surface or said contour runs completely outside the body. In particular, a contour having a total curvature of 90° or less may also form a concave-curved work contour. A "work contour" is in particular intended to mean a contour of a work surface, respectively of a machining surface of a profile machining tool, which is configured for a manipulation of the edge shape of the stone slab. By a process being "fully automated" is in particular to be understood that the process is free of any influence of a user, in particular except for a starting or a stopping of the process. The memory unit is in particular realized as a volatile or non-volatile data storage medium of the tool presetting and/or tool measuring apparatus.

Furthermore it is proposed that in at least one second tool measuring step, which is preferably executed temporally after the first tool machining step, an at least partly and/or at least section-wise concave work contour, in particular milling contour or polishing contour, of a second profile machining tool of the set of profile machining tools is optically captured in an at least semi-automated, preferably fully automated manner, wherein in at least one second tool presetting step the profile coordinates of the second profile machining tool determined in the second tool measuring step are aligned with the profile coordinates of the first profile machining tool which were previously determined in the first tool measuring step. In this way successive machining of the stone slab is advantageously enabled, which in particular makes a particularly high precision of the stone slab machining achievable. By "profile coordinates being aligned with one another" is in particular to be understood that profile coordinates of a profile machining tool measured later are referenced to profile coordinates of the previously measured profile machining tool. By profile coordinates being aligned with one another is in particular also to be understood that the profile coordinates of the later-measured profile machining tool are oriented along the profile coordinates of the previously measured profile machining tool. In particular, the profile coordinates are configured to be output to a machine tool which, preferably on the basis of the profile data, machines the stone slab with the profile machining tool, in particular positions the profile machining tool relative to the stone slab that is to be machined.

When therefore in the second tool presetting step the profile coordinates of the work contour of the first profile machining tool, are inputted, in particular to a measuring coordinate system of the tool presetting and/or tool measuring apparatus and/or in a machining coordinate system of the machine tool, as reference coordinates for a relative positioning of profile coordinates of the captured work contour of the second profile machining tool, and are stored in the memory unit of the tool presetting and/or tool measuring apparatus, and/or are transferred to the machine tool, a particular high degree of precision of the stone slab machining is advantageously achievable. Moreover, a long lifetime of the profile machining tools is advantageously achievable.

It is also proposed that the optical measuring and/or presetting method comprises at least a plurality of, in particular at least five, further tool measuring steps, in which at least partly concave and/or at least section-wise concave work contours, in particular milling contours or polishing contours, of a plurality of further profile machining tools, in particular of at least five further profile machining tools, of the set of profile machining tools are optically captured in an at least semi-automated, preferably fully automated manner, wherein in each of the further tool measuring steps, the profile coordinates of the further profile machining tools determined therein, are, in each case in at least one allocated further tool presetting step, aligned with the profile coordinates of one of the previously measured further profile machining tools, which were determined in the preceding tool measuring step. In this way a particularly high precision of tool measuring, tool presetting and/or stone slab machining are/is advantageously achievable.

Beyond this it is proposed that in the combined measuring and/or presetting of the plurality of individual profile machining tools of the set of profile machining tools, in at least one tool measuring step a profile milling tool, in particular a profiling wheel, is optically measured, and in at least one tool measuring step which, in particular directly, follows said tool measuring step a profile polishing tool, in particular a profile polishing wheel, is optically measured. This in particular allows achieving an advantageous adaptation of the machining steps executed by the different profile machining tools (profile milling tools and profile polishing tools). Advantageously an especially efficient, effective and precise stone slab machining is enabled.

It is furthermore proposed that in a tool presetting step following the tool measuring step in which the profile polishing tool was measured and which is allocated to the profile polishing tool measured in the tool measuring step, the determined profile coordinates of the profile polishing tool are aligned with the profile coordinates of the first profile machining tool, embodied as a profile milling tool, which were previously determined in the first tool measuring step. In this way in particular an advantageous adaptation of the machining steps carried out by the different profile machining tools (profile milling tools and profile polishing tools) is achievable. As a result, advantageously a particularly efficient, effective and precise stone slab machining is enabled. Alternatively it is also conceivable that the determined profile coordinates of the profile polishing tools are aligned with the profile coordinates of the profile milling tool which were determined in the, in particular directly, preceding tool measuring step executed on the profile milling tool, In addition it is proposed that in the first tool measuring step of the combined measuring and/or presetting of the plurality of individual profile machining tools of the set of profile machining tools, which is executed on a profile milling tool, the profile milling tool of the set of profile machining tools which has the least-coarse machining surface, in particular the profile milling tool of the set of profile machining tools with the finest grit, preferably the finest diamond grit, is measured, and that the profile milling tools that are to be measured in the following tool measuring steps are sorted in ascending order by the coarseness of the machining surfaces of the profile milling tools, in particular in ascending order with increasing grit, preferably with increasing diamond grit. In this way a logical measuring sequence is advantageously achievable, which in particular takes a nominal stock removal of a profile milling tool succeeding in the machining cycle into account. As a result, an especially high precision of stone slab edge machining is advantageously achievable.

If moreover first at least one of the profile milling tools of the set of profile machining tools, in particular the profile milling tool of the set of profile machining tools having the machining surface with the finest grit, in particular the finest diamond grit, is measured and/or preset before one or several profile polishing tool/s of the set of profile machining tools is/are measured and/or preset, a nominal stock removal of the profile milling tools applied in the machining cycle prior to the profile polishing tools can also be taken into account when presetting the profile polishing tools. This advantageously allows achieving an especially high accuracy of the stone slab edge machining. Preferentially, firstly all profile milling tools of the set of profile machining tools are measured and/or preset before one or several profile polishing tool's of the set of profile machining tools is/are measured and/or preset.

Furthermore it is proposed that the profile coordinates determined in the tool measuring steps on profile polishing tools of the set of profile machining tools are in each case aligned with the determined profile coordinates of the profile milling tool of the set of profile machining tools which has the finest machining surface, in particular the machining surface with the finest grit, in particular the finest diamond grit, in particular to the firstly-determined profile coordinates of the profile milling tool of the set of profile machining tools. This advantageously allows taking a nominal stock removal of the profile milling tools used in the machining cycle prior to the profile polishing tools into account when presetting the profile polishing tools. Advantageously a particularly high accuracy of the stone slab edge machining is achievable.

If the profile coordinates stored in the tool presetting steps are overlaid with coordinates of a side edge of a stone slab, which is to be machined, advantageously an especially effective and/or especially precise machining of the side edge of the stone slab may be enabled.

If moreover the profile coordinates of the individual profile machining tools of the set of profile machining tools, which were determined in the tool measuring steps, are overlaid, in particular superimposed, as precisely as possible in the tool presetting steps, a particularly accurate machining of the side edge of the stone slab is advantageously enabled, as a result of which in particular an especially smooth and even edge surface of the stone slab will be obtained.

If alternatively the profile coordinates of the individual profile machining tools of the set of profile machining tools, which were determined in the tool measuring steps, are overlaid with an offset in the tool presetting steps, advantageously a stock removal made by the respective profile machining tool can be taken into account already when transmitting the profile coordinates of the profile machining tools to the machine foal. This advantageously allows facilitating an operation of the machine tool, for example as no information of a nominal stock removal of the profile machining tools, or the like, needs to be inputted into the machine tool, and/or as a monitoring of the stock removal during a machining step may be dispensed with. In particular, herein the profile milling tool with the finest grit, in particular diamond grit, of its machining surface is free of an offset. In particular, herein the offset of the profile milling tools increases with an increasing grit of the machining surface.

Beyond this it is proposed that the offset induces a displacement of the profile coordinates (respectively provided with the offset) in a direction that is parallel to the main extension plane of the stone slab that is to be machined. In this way advantageously a maximum stock removal of a profile milling tool or a maximum pressure of a profile polishing tool can be adjusted simply by adjusting the profile coordinates. By a "main extension plane" of an object, in particular of the stone slab, is advantageously a plane to be understood which is parallel to a largest side surface of a smallest imaginary rectangular cuboid just still completely enclosing the object, in particular the stone slab, and which in particular extends through the center point of the rectangular cuboid.

It is also proposed that an offset assigned to at least one of the profile machining tools of the set of profile machining tools, which are embodied as profile milling tools, is adjusted relative to the determined profile coordinates of the profile milling tool of the set of profile machining tools which was measured before, in particular directly before. In this way accurate machining of the stone slab is advantageously enabled, in particular without requiring a monitoring of a stock removal or of a movement of the profile milling tools by the machine tool. Advantageously, in each case some material can be left over for the stock removal by the following profile milling tool, such that a desired edge position of the ready-machined stone slab is achievable in a particularly simple manner.

Furthermore, it is proposed that an offset assigned to at least one of the profile machining tools of the set of profile machining tools, which are embodied as profile milling tools, corresponds to a given ideal stock removal value of this profile milling tool, which is in particular given by a manufacturer of this profile milling tool. In this way an especially long lifetime of the profile milling tools is advantageously achievable, thus in particular allowing costs to be kept at a low level.

In addition, it is proposed that an offset assigned to at least one of the profiling machining tools of the set of profile machining tools, which are in particular embodied as profile polishing tools, is adjusted relative to the determined profile coordinates of the previously measured profile milling tool of the set of profile machining tools, which has the finest machining surface of all profile milling tools of the set of profile machining tools. As a result, a desired edge position of the ready-machined and polished stone slab is advantageously achievable in a particularly simple manner.

It is further proposed that at least one offset assigned to a profile milling tool in a tool presetting step has a direction that is opposed to an offset assigned to a profile polishing tool in a further tool presetting step. As a result, on the one hand, by the offset of the profile milling tools, i.e. just on the basis of the profile data of the profile milling tools transmitted to the machine tool (and adapted), a material for a stock removal of the profile milling tool that follows in the machining cycle can be advantageously left behind, on the other hand, by the offset of the profile polishing tools, i.e. just on the basis of the (adapted) profile data of the profile polishing tools transmitted to the machine tool, a polishing pressure can be adjusted, in particular in each case without requiring extra adjustments at the machine tool. In particular, the respective offset of the profile polishing tools is chosen such that a polishing pressure which is ideal for a respective profile polishing tool is exerted onto the stone slab edge by the machine tool pressing the profile polishing tool to the stone slab. Advantageously, damaging of profile polishing tools, for example by breaking apart due to a too high pressing pressure, can be avoided by an optimum adjustment of the polishing pressure, thus keeping costs at an advantageously low level.

Moreover, it is proposed that in at least one output step the determined and respectively aligned profile coordinates are transmitted to a machine tool, in particular a CNC-controlled milling and polishing machine, preferably a machining center, in a machine-readable form, for example via a Distributed Numerical Control (DNC) system. In this way in particular an advantageous machining flow of the stone slab is enabled for creating the desired edge shape, which advantageously requires no separate adjustment at the machine tool (ideal stock removal, ideal contact pressure, etc.).

In addition, it is proposed that an offset assigned to at least one of the profile milling tools of the set of profile machining tools causes a dataset with a virtually enlarged profile milling tool being transmitted to the machine tool. In this way it is advantageously achievable that, without necessitating additional adjustments to be made at the machine tool, the profile milling tools leave in each case sufficient material of the stone slab for the ideal stock removal of the profile milling tools following in the stone slab machining cycle. Advantageously particularly precise positioning of the machined stone slab edge is achievable. By a "virtually enlarged profile milling tool" is in particular to be understood that the measured profile data of a profile milling tool are provided with the respective offset and thus the dimensions of the profile milling tool contained in the transmitted dataset are larger (by the offset value) than the real dimensions of the profile milling tool. By the virtually enlarged profile milling tool is in particular a virtual model of the profile milling tool to be understood which is enlarged by the offset and/or via the offset.

It is further proposed that an offset assigned to at least one of the profile polishing tools of the set of profile machining tools causes a dataset with a virtually downscaled profile polishing tool being transmitted to the machine tool. In this way it is advantageously achievable that, without requiring additional adjustments of the machine tool to be made, the profile polishing tools polish the stone slab edges, which were previously milled by the profile milling tools in the stone slab machining cycle, with an ideal polishing pressure. By a "virtually downscaled profile polishing tool" is in particular to be understood that the measured profile data of a profile polishing tool are provided with the respective offset and therefore the dimensions of the profile polishing tool contained in the transmitted dataset are smaller (by the offset value) than the real dimensions of the profile polishing tool. By the virtually downscaled profile milling tool is in particular a virtual model of the profile polishing tool to be understood, which is downscaled by the offset.

If at least the profile coordinates stored in the first tool presetting step are automatically aligned relative to the stone slab that is to be machined, a particularly easy operating of the tool presetting and/or tool measuring apparatus is advantageously achievable.

If moreover, for the alignment of the profile coordinates relative to the stone slab a point of the work contour of the profile machining tool measured in the first tool measuring step is identified, in which the work contour takes on a maximum curvature radius, an especially reliable automatic positioning and/or alignment of the profile coordinates is achievable relative to the stone slab that is to be machined.

Furthermore, an optical tool presetting and/or tool measuring apparatus is proposed, for an execution of the optical measuring and/or presetting method. This advantageously allows achieving a high precision, in particular of a stone slab machining step following the tool measuring step and/or the tool presetting step. It is advantageously possible to shorten downtimes of machine tools Moreover, a lifetime of the profile machining tools can be advantageously maximized by a high presetting accuracy of profile machining tools. Advantageously costs, in particular costs per item, can be reduced. Preferably the tool presetting and/or tool measuring apparatus comprises a control and/or regulation unit, which is configured to carry out the optical measuring and/or presetting method. A "control and/or regulation unit" is in particular to mean a unit with at least one control electronics component. A "control electronics component" is in particular to mean a unit with a processor and with a memory unit (e. g. RAM, ROM, HDD, etc.) and with an operation program which is stored in the memory unit and can be called up and carried out by the processor for an execution of the optical measuring and/or presetting method.

The optical measuring and/or presetting method according to the invention and the optical tool presetting and/or tool measuring apparatus according to the invention shall herein not be limited to the application and implementation described above. In particular, to fulfill a functionality that is described here, the optical measuring and/or presetting method according to the invention and the optical tool presetting and/or tool measuring apparatus according to the invention may have a number of individual elements, components, method steps and units which differs from a number given here.

"Configured" is in particular to mean specifically programmed, designed and/or implemented. By an object being configured for a certain function is in particular to be understood that the object fulfills and/or executes said certain function in at least one application state and/or operation state.

DRAWINGS

Further advantages will become apparent from the following description of the drawings. In the drawings an exemplary embodiment of the invention is illustrated.

The drawings, the description and the claims contain a plurality of features in combination. Someone skilled in the art will purposefully also consider the features individually and will find further expedient combinations.

Figure 2:
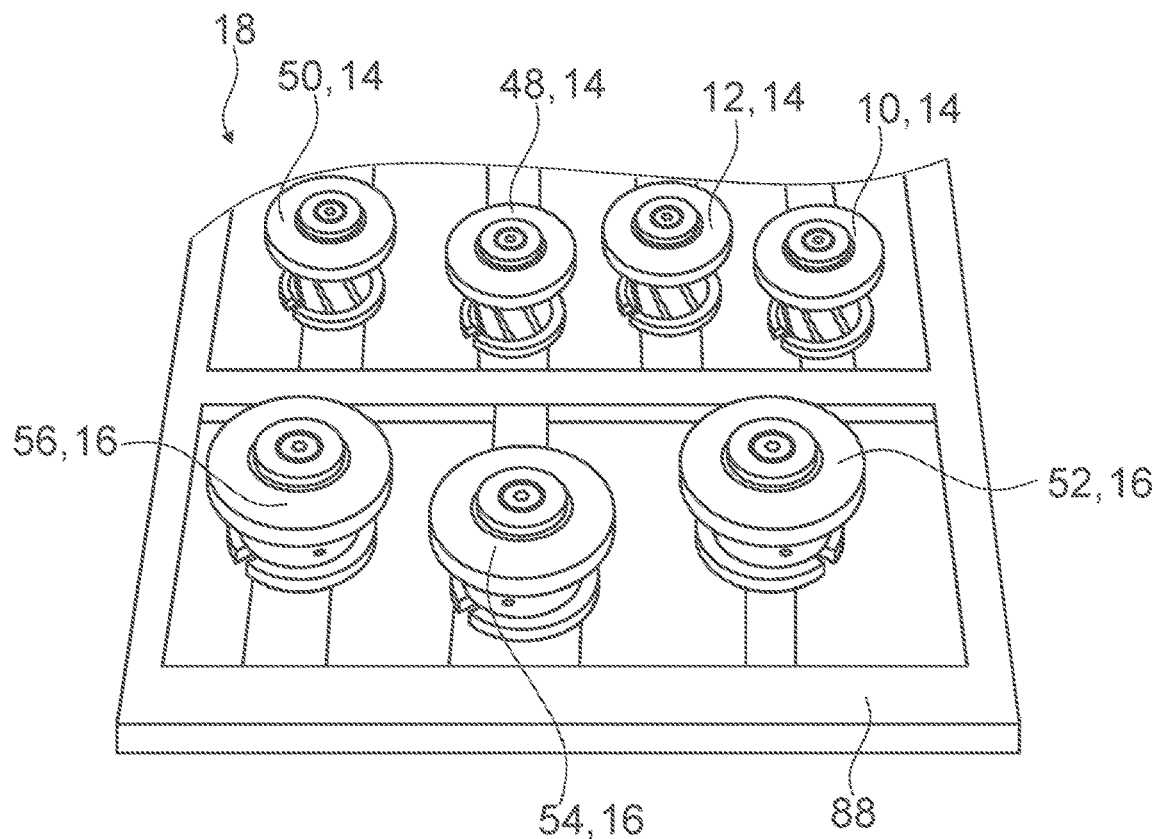
Figure 3A:
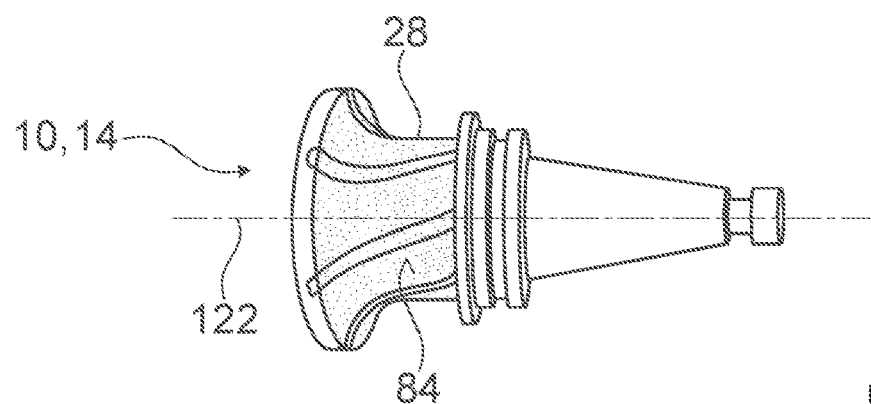
Figure 3B:
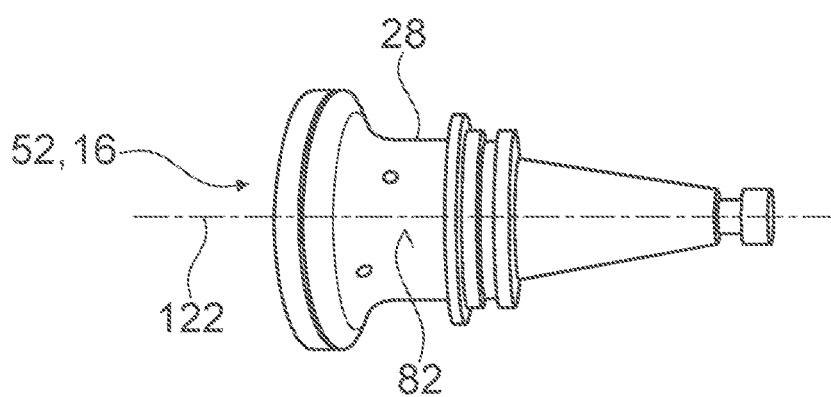
Figure 4A:
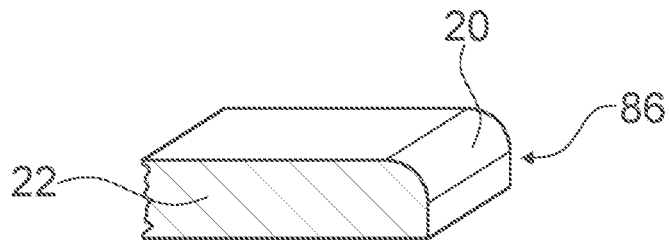
Figure 4B:
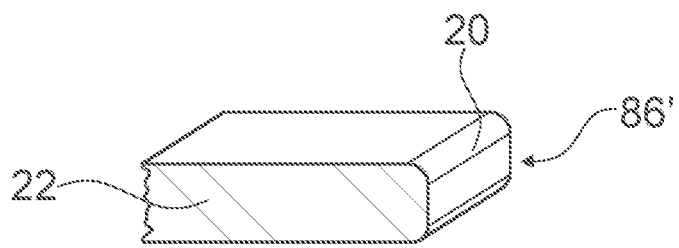
Figure 4C:
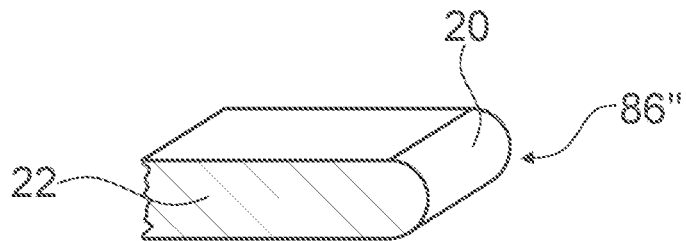
Figure 4D:
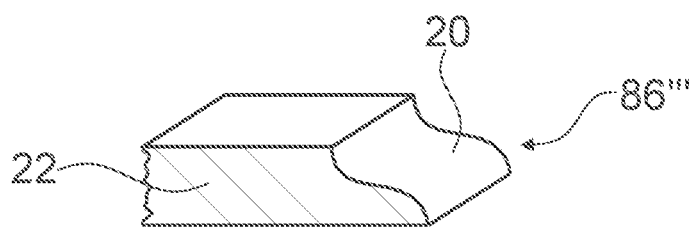
Figure 4E:
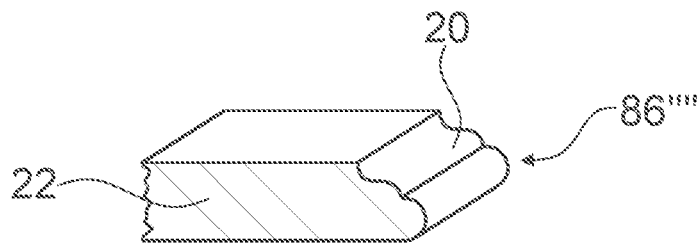
Figure 4F:
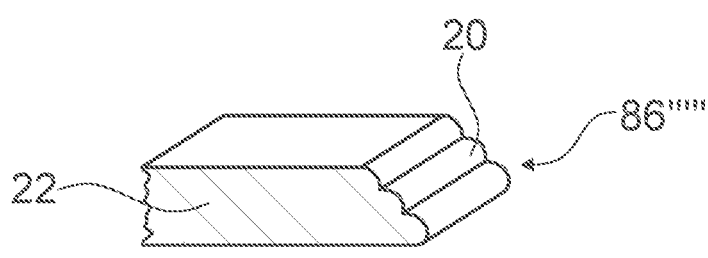
Figure 5:
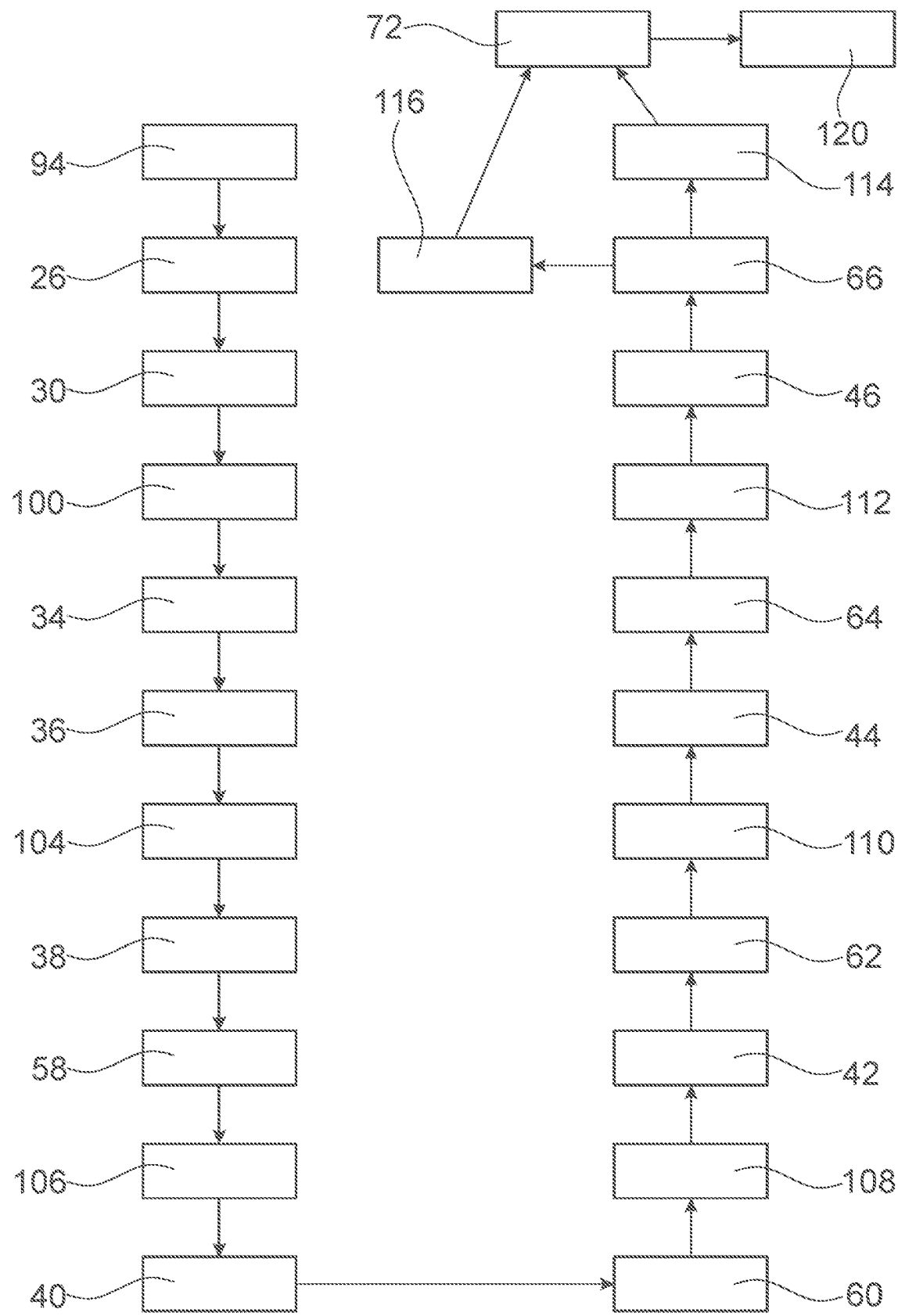
Figure 6A:
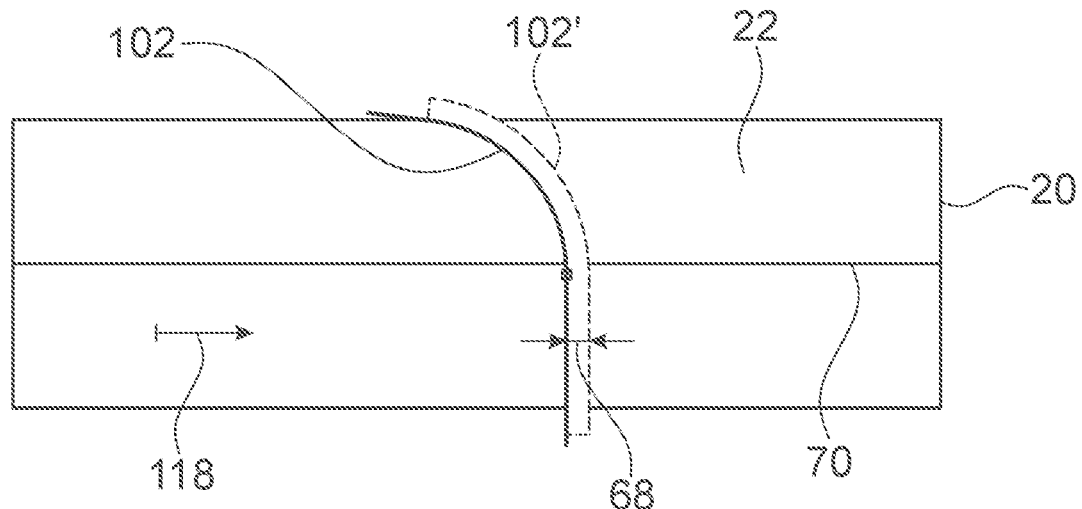
Figure 6B:
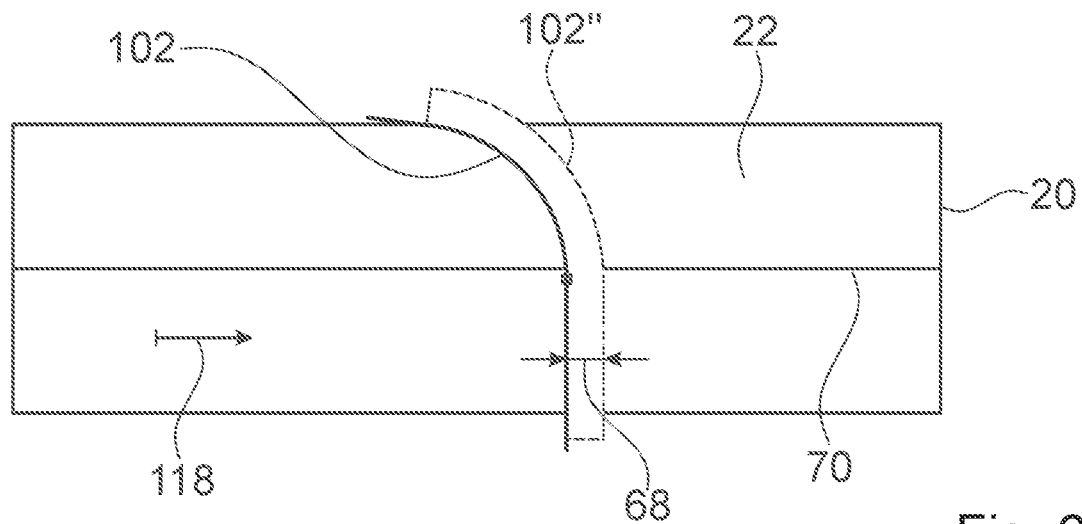
Figure 6C:
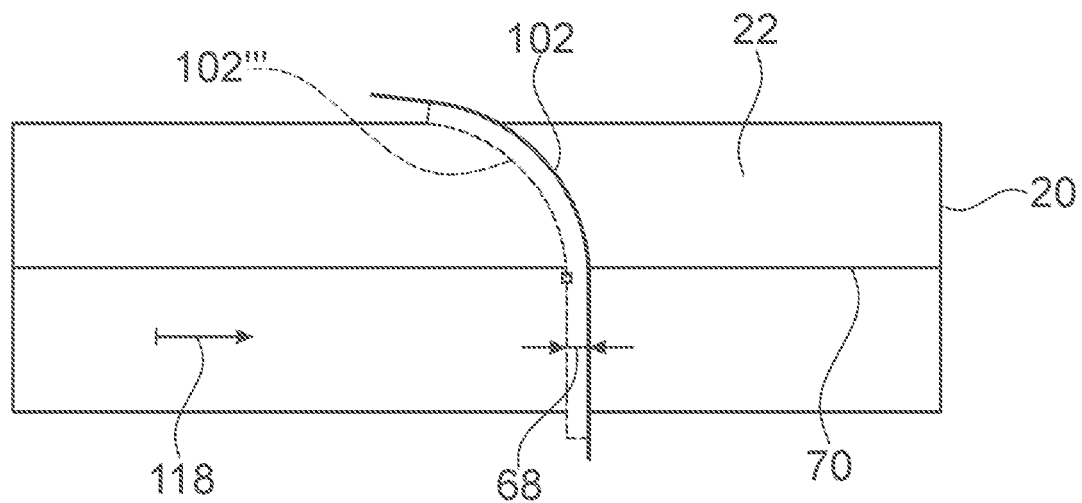

It is shown in:

FIG. 1 a schematic illustration of a tool presetting and/or tool measuring apparatus communicating with a machine tool, FIG. 2 a schematic illustration of a set of profile machining tools in a holding device, FIG. 3a a schematic side view of a profile milling tool of the set of profile machining tools, FIG. 3b a schematic side view of a profile polishing tool of the set of profile machining tools, FIG. 4a a schematic sectional view of a stone slab with a first edge shape, FIG. 4b a schematic sectional view of an exemplary stone slab with a second edge shape, FIG. 4c a schematic sectional view of an exemplary stone slab with a third edge shape, FIG. 4d a schematic sectional view of an exemplary stone slab with a fourth edge shape, FIG. 4e a schematic sectional view of an exemplary stone slab with a fifth edge shape, FIG. 4f a schematic sectional view of an exemplary stone slab with a sixth edge shape, FIG. 5 a schematic flow chart of an optical measuring and/or presetting method, FIG. 6a a schematic representation of measured profile coordinates of the profile machining tools with a first offset, FIG. 6b a schematic representation of measured profile coordinates of the profile machining tools with a second offset, and FIG. 6c a schematic representation of measured profile coordinates of the profile machining tools with a third offset.

DESCRIPTION OF THE EXEMPLARY EMBODIMENT

FIG. 1 shows an optical tool presetting and/or tool measuring apparatus 24. The tool presetting and/or tool measuring apparatus 24 is configured for an execution of the optical measuring and/or presetting method that is described here. The tool presetting and/or tool measuring apparatus 24 is configured for an optical measuring of tools. The tool presetting and/or tool measuring apparatus 24 is configured for a presetting of tools. The tool presetting and/or tool measuring apparatus 24 comprises an optical measuring device 76 with a camera 78 and a lighting 80. In the case shown by way of example, the optical measuring device 76 implements a transmitted-light measuring arrangement. Alternatively it is however also conceivable that the optical measuring device 76 implements an incident-light measuring arrangement. The tool presetting and/or tool measuring apparatus 24 comprises a rotatable spindle unit 96, which forms a tool receiving region 98 for receiving the tool that is to be measured or a tool chuck with the tool that is to be measured. The tool presetting and/or tool measuring apparatus 24 comprises a control and/or regulation unit 90. The control and/or regulation unit 90 comprises a processor 92 and a memory unit 32 with a storage medium. The control and/or regulation unit 90 is configured for controlling and/or regulating the tool presetting and/or tool measuring apparatus 24, in particular the execution of the optical measuring and/or presetting method by the tool presetting and/or tool measuring apparatus 24. In the present case the tool presetting and/or tool measuring apparatus 24 is configured specifically for a combined optical measuring and presetting of a plurality of individual profile machining tools 10, 12, 48, 50, 52, 54, 56. FIG. 1 further shows an exemplary machine tool 74. The machine tool 74 is configured for a machining of a stone slab 22 by means of profile machining tools 10, 12, 48, 50, 52, 54, 56.

In FIG. 2 seven profile machining tools 10, 12, 48, 50, 52, 54, 56, which are fixated in a holding device 88, are shown by way of example. The seven profile machining tools 10, 12, 48, 50, 52, 54, 56 form a set of profile machining tools 18. The individual profile machining tools 10, 12, 48, 50, 52, 54, 56 of the set of profile machining tools 18 are configured for a successive machining of side edges 20 of stone slabs 22 (see also FIGS. 4a to 4f). The set of profile machining tools 18 forms a unit of profile machining tools 10, 12, 48, 50, 52, 54, 56 which belong together and which are necessary to create a defined side edge shape of the stone slab 22.

In the illustrated example, the set of profile machining tools 18 comprises four profile machining tools 10, 12, 48, 50 which are embodied as profile milling tools 14, in particular as profiling wheels. The first profile machining tool 10 is embodied as a profile milling tool 14, in particular a profiling wheel. The second profile machining tool 12 is embodied as a profile milling tool 14, in particular a profiling wheel. The third profile machining tool 48 is embodied as a profile milling tool 14, in particular a profiling wheel. The fourth profile machining tool 50 is embodied as a profile milling tool 14, in particular a profiling wheel. The four profile machining tools 10, 12, 48, 50 embodied as profile milling tools 14 respectively have machining surfaces 84 of different coarseness. The first profile machining tool 10 embodied as a profile milling tool 14 has the finest machining surface 84, in particular the machining surface 84 with the finest grit, of all profile machining tools 10, 12, 48, 50 embodied as profile milling tools 14. The second profile machining tool 12 embodied as a profile milling tool 14 has the second-finest machining surface 84, in particular the machining surface 84 with the second-finest grit, of all profile machining tools 10, 12, 48, 50 embodied as profile milling tools 14. The third profile machining tool 48 embodied as a profile milling tool 14 has the third-finest machining surface 84, in particular the machining surface 84 with the third-finest grit, of all profile machining tools 10, 12, 48, 50 embodied as profile milling tools 14. The fourth profile machining tool 50 embodied as a milling tool 14 has the coarsest machining surface 84, in particular the machining surface 84 with the coarsest grit, of all profile machining tools 10, 12, 48, 50 embodied as profile milling tools 14. The machining surface 84 is arranged on a radial outer circumference of the profile machining tools 10, 12, 48, 50 embodied as profile milling tools 14. For a machining of the stone slab 22 the profile machining tool 10, 12, 48, 50 embodied as a profile milling tool 14 is rotated and is brought into contact with the side edge 20 of the stone slab 22 with its radial outer circumference, i. e. in particular with its machining surface 84.

In the illustrated example the set of profile machining tools 18 comprises three profile machining tools 52, 54, 56 which are embodied as profile polishing tools 16, in particular as profile polishing wheels. The fifth profile machining tool 52 is embodied as a profile polishing tool 16, in particular a profile polishing wheel. The sixth profile machining tool 54 is embodied as a profile polishing tool 16, in particular a profile polishing wheel. The seventh profile machining tool 56 is embodied as a profile polishing tool 16, in particular a profile polishing wheel. The three profile machining tools 52, 54, 56 embodied as profile polishing tools 16 respectively have polishing surfaces 82 of differing hardness. The first profile machining tool 52 embodied as a profile polishing tool 16 has the softest polishing surface 82, in particular the polishing surface 82 with the softest rubber material, of all profile machining tools 52, 54, 56 embodied as profile polishing tools 16. The second profile machining tool 54 embodied as a profile polishing tool 16 has the second-softest polishing surface 82, in particular the polishing surface 82 with the second-softest rubber material, of all profile machining tools 52, 54, 56 embodied as profile polishing tools 16. The third profile machining tool 56 embodied as a profile polishing tool 16 has the hardest polishing surface 82, in particular the polishing surface 82 with the hardest rubber material, of all profile machining tools 52, 54, 56 embodied as profile polishing tools 16. The polishing surface 82 is arranged on a radial outer circumference of the profile machining tools 52, 54, 56 embodied as profile polishing tools 16. For a machining of the stone slab 22 the profile machining tool 52, 54, 56 embodied as a profile polishing tool 16 is rotated and is brought into contact with the side edge 20 of the stone slab 22 with its radial outer circumference, i.e. in particular with the polishing surface 82.

All profile machining tools 10, 12, 48, 50, 52, 54, 56, in particular all profile milling tools 14 and all profile polishing tools 16, have an at least substantially identical work contour 28, in particular milling contour of the machining surface 84 (see FIG. 3a) or polishing contour of the polishing surface 82 (see FIG. 3b). The work contour 28 of the profile machining tools 10, 12, 48, 50, 52, 54, 56 is partly concave-curved. The work contour 28 of the profile machining tools 10, 12, 48, 50, 52, 54, 56 is section-wise concave-curved. The work contour 28 of the profile machining tools 10, 12, 48, 50, 52, 54, 56 emulates a desired edge shape 86 of the stone slab 22 that is to be machined. The profile machining tools 10, 12, 48, 50, 52, 54, 56 are realized substantially rotationally symmetrically around a rotation axis 122. The profile machining tools 10, 12, 48, 50, 52, 54, 56 are configured, for a machining of the stone slab 22, to be rotated around the rotation axis 122 (see also FIGS. 3a and 3b).

FIGS. 4a to 4f show different exemplary edge shapes 86, 86', 86'', 86''', 86'''' 86''''' of side edges 20 of stone slabs 22. The edge shape 86 shown in FIG. 4a corresponds to the outer shape of the side edge 20 of the stone slab 22 that can be generated by the set of profile machining tools 18 shown exemplarily in FIG. 2. The edge shape 86 shown in FIG. 4a is rounded on an upper side. The edge shapes 86', 86'', 86''', 86'''', 86''''' shown in FIGS. 4b to 4f in each case require sets of differently shaped profile machining tools. In the edge shape 86' shown in FIG. 4b the upper and the lower edge are rounded. In FIG. 4c a so-called "bullnose" edge shape is illustrated. In FIG. 4d a so-called "ogee" edge shape is illustrated. In FIG. 4e a combination of the "ogee" edge shape (above) and the "bullnose" edge shape (below) is illustrated. In FIG. 4f a three-fold curved or so-called "triple pencil" edge shape is illustrated.

FIG. 5 shows a flow chart of the optical measuring and/or presetting method for the combined measuring and/or presetting of the set of profile machining tools 18 comprising the plurality of individual profile machining tools 10, 12, 48, 50, 52, 54, 56. The method steps 26, 30, 34, 36, 38, 40, 42, 44, 46, 58, 60, 62, 64, 66, 72, 94, 100, 104, 106, 108, 110, 112, 114, 116 of the measuring and/or presetting method are carried out by means of the tool presetting and/or tool measuring apparatus 24.

In a method step 94 the first profile machining tool 10 of the set of profile machining tools 18 is inserted into the spindle unit 96 of the tool presetting and/or tool measuring apparatus 24. In a first tool measuring step 26 the work contour 28 of the first profile machining tool 10 of the set of profile machining tools 18 is optically captured and/or measured by the tool presetting and/or tool measuring apparatus 24. In a first tool presetting step 30 profile coordinates 102 are assigned to the work contour 28 of the first profile machining tool 10 captured in the first tool measuring step 26 (see also FIGS. 6a to 6c). In the first tool presetting step 30 the assigned profile coordinates 102 are stored in the memory unit 32 of the tool presetting and/or tool measuring apparatus 24. The profile coordinates 102 stored in the first tool presetting step 30 are automatically aligned relative to a position of the stone slab 22 that is to be machined. This may be effected either already on the tool presetting and/or tool measuring apparatus 24 or later on, after transmission to the machine tool 74, on the machine tool 74 itself. In the first tool measuring step 26 the profile milling tool 14 of the set of profile machining tools 18 is measured which has the least coarse machining surface 84, in particular the finest grit. Tool measuring steps 34, 38, 40 following the first tool measuring step 26, in which profile milling tools 14 are measured, are sorted temporally in ascending order of coarseness of the machining surface 84 of the profile milling tools 14. However, different temporal sortings and/or sequences of further tool measuring steps 34, 38, 40, 42, 44, 46 following the first tool measuring step 26 are also conceivable. In any case one of the profile milling tools 14 of the set of profile machining tools 18 is measured and/or preset before one or several profile milling tool/s 16 of the set of profile machining tools 18 is/are measured and/or preset. In a further method step 100 the first profile machining tool 10 is removed out of the spindle unit 96 and the second profile machining tool 12 of the set of profile machining tools 18 is inserted into the spindle unit 96.

In a second tool measuring step 34, which in particular takes place temporally after the first tool measuring step 26, the work contour 28 of the second profile machining tool 12 of the set of profile machining tools 18 is captured and/or measured. In a second tool presetting step 36 profile coordinates 102 are assigned to the work contour 28 of the second profile machining tool 12 captured in the second tool measuring step 34. The profile coordinates 102 of the second profile machining tool 12, which were determined in the second tool measuring step 34, are in the second tool presetting step 36 aligned with the profile coordinates 102 of the first profile machining tool 10, which were previously determined in the first tool measuring step 26. In the second tool presetting step 36 the profile coordinates 102 of the work contour 28 of the first profile machining tool 10 are inputted as reference coordinates for a relative positioning of profile coordinates 102 of the captured and/or measured work contour 28 of the second profile machining tool 12. In the second tool presetting step 36 the assigned profile coordinates 102 are stored in the memory unit 32 of the tool presetting and/or tool measuring apparatus 24. In a further method step 104 the second profile machining tool 12 is removed out of the spindle unit 96 and the third profile machining tool 48 of the set of profile machining tools 18 is inserted into the spindle unit 96.

In a third tool measuring step 38, which in particular takes place temporally after the second tool measuring step 34, the work contour 28 of the third profile machining tool 48 of the set of profile machining tools 18 is captured and/or measured. In a third tool presetting step 58 profile coordinates 102 are assigned to the work contour 28 of the third profile machining tool 48 captured in the third tool measuring step 38. In the third tool presetting step 58 the profile coordinates 102 of the third profile machining tool 48, which were determined in the third tool measuring step 38 are aligned with the profile coordinates 102 of the first profile machining tool 10 which were previously determined in the first tool measuring step 26. In the third tool presetting step 58 the profile coordinates 102 of the work contour 28 of the first profile machining tool 10 are inputted as reference coordinates for a relative positioning of profile coordinates 102 of the captured and/or measured work contour 28 of the third profile machining tool 48. The assigned profile coordinates 102 are in the third tool presetting step 58 stored in the memory unit 32 of the tool presetting and/or tool measuring apparatus 24. In a further method step 106 the third profile machining tool 48 is removed out of the spindle unit 96 and the fourth profile machining tool 50 of the set of profile machining tools 18 is inserted into the spindle unit 96.

In a fourth tool measuring step 40, which in particular takes place temporally after the third tool measuring step 38, the work contour 28 of the fourth profile machining tool 50 of the set of profile machining tools 18 is captured and/or measured. In a fourth tool presetting step 60 profile coordinates 102 are assigned to the work contour 28 of the fourth profile machining tool 50 captured in the fourth tool measuring step 40. In the fourth tool presetting step 60 the profile coordinates 102 of the fourth profile machining tool 50, which were determined in the fourth tool measuring step 40, are aligned with the profile coordinates 102 of the first profile machining tool 10, which were previously determined in the first tool measuring step 26. In the fourth tool presetting step 60 the profile coordinates 102 of the work contour 28 of the first profile machining tool 10 are inputted as reference coordinates for a relative positioning of profile coordinates 102 of the captured and/or measured work contour 28 of the fourth profile machining tool 50. The assigned profile coordinates 102 are in the fourth tool presetting step 60 stored in the memory unit 32 of the tool presetting and/or tool measuring apparatus 24. In a further method step 108 the fourth profile machining tool 50 is removed out of the spindle unit 96 and the fifth profile machining tool 52 of the set of profile machining tools 18 is inserted into the spindle unit 96.

In a fifth tool measuring step 42, which in particular takes place temporally after the fourth tool measuring step 40, the work contour 28 of the fifth profile machining tool 52 of the set of profile machining tools 18 is captured and/or measured. In a fifth tool presetting step 62 profile coordinates 102 are assigned to the work contour 28 of the fifth profile machining tool 52 captured in the fifth tool measuring step 42. The profile coordinates 102 of the fifth profile machining tool 52, which were determined in the fifth tool measuring step 42, are in the fifth tool presetting step 62 aligned with the profile coordinates 102 of the first profile machining tool 10, which were previously determined in the first tool measuring step 26. In the fifth tool presetting step 62 the profile coordinates 102 of the work contour 28 of the first profile machining tool 10 are inputted as reference coordinates for a relative positioning of profile coordinates 102 of the captured and/or measured work contour 28 of the fifth profile machining tool 52. The assigned profile coordinates 102 are in the fifth tool presetting step 62 stored in the memory unit 32 of the tool presetting and/or tool measuring apparatus 24. In a further method step 110 the fifth profile machining tool 52 is removed out of the spindle unit 96 and the sixth profile machining tool 54 of the set of profile machining tools 18 is inserted into the spindle unit 96.

In a sixth tool measuring step 44, which in particular takes place temporally after the fifth tool measuring step 42, the work contour 28 of the sixth profile machining tool 54 of the set of profile machining tools 18 is captured and/or measured. In a sixth tool presetting step 64 profile coordinates 102 are assigned to the work contour 28 of the sixth profile machining tool 54, which was captured in the sixth tool measuring step 44. In the sixth tool presetting step 64 the profile coordinates 102 of the sixth profile machining tool 54 determined in the sixth tool measuring step 44 are aligned with the profile coordinates 102 of the first profile machining tool 10, which were previously determined in the first tool measuring step 26. In the sixth tool presetting step 64 the profile coordinates 102 of the work contour 28 of the first profile machining tool 10 are inputted as reference coordinates for a relative positioning of the profile coordinates 102 of the captured and/or measured work contour 28 of the sixth profile machining tool 54. The assigned profile coordinates 102 are in the sixth tool presetting step 64 stored in the memory unit 32 of the tool presetting and/or tool measuring apparatus 24. In a further method step 112 the sixth profile machining tool 54 is removed out of the spindle unit 96 and the seventh profile machining tool 56 of the set of profile machining tools 18 is inserted into the spindle unit 96, In a seventh tool measuring step 46, which in particular takes place temporally after the sixth tool measuring step 44, the work contour 28 of the seventh profile machining tool 56 of the set of profile machining tools 18 is captured and/or measured. In a seventh tool presetting step 66 profile coordinates 102 are assigned to the work contour 28 of the seventh profile machining tool 56 captured in the seventh tool measuring step 46. In the seventh tool presetting step 66 the profile coordinates 102 of the seventh profile machining tool 56, which were captured in the seventh tool measuring step 46, are aligned with the profile coordinates 102 of the first profile machining tool 10, which were previously determined in the first tool measuring step 26. In the seventh tool presetting step 66 the profile coordinates 102 of the work contour 28 of the first profile machining tool 10 are inputted as reference coordinates for a relative positioning of profile coordinates 102 of the captured and/or measured work contour 28 of the seventh profile machining tool 56. The assigned profile coordinates 102 are in the seventh tool presetting step 66 stored in the memory unit 32 of the tool presetting and/or tool measuring apparatus 24, The profile coordinates 102 stored in the tool presetting steps 30, 36, 58, 60, 62, 64, 66 are overlaid with coordinates of the side edge 20 of the stone slab 22, which is to be machined (see also FIGS. 6a to 6c).

In the combined measuring and/or presetting of the plurality of individual profile machining tools 10, 12, 48, 50, 52, 54, 56 of the set of profile machining tools 18, in the fourth tool measuring step 40 a profile milling tool 14, in particular a profiling wheel, is optically measured, and in the fifth tool measuring step 42, which follows said fourth tool measuring step 40, a profile polishing tool 16, in particular a profile polishing wheel, is optically measured. In the tool presetting step 62, which follows the fifth tool measuring step 42 in which the profile polishing tool 16 was measured, and which belongs to the profile polishing tool 16 measured in the tool measuring step 42, the determined profile coordinates 102''' of the profile polishing tool 16 are aligned with the profile coordinates 102 of the first profile machining tool 10 embodied as a profile milling tool 14, which were previously determined in the first tool measuring step 26 (see also FIG. 6c).

In at least one further method step 114 the profile coordinates 102, determined in the tool measuring steps 26, 34, 38, 40, 42, 44, 46, of the individual profile machining tools 10, 12, 48, 50, 52, 54, 56 of the set of profile machining tools 18, which were stored in the tool presetting steps 30, 36, 58, 60, 62, 64, 66, are overlaid relative to one another as precisely as possible. In this case the machine tool 74 realizes, in a following machining of the stone slab 22, the monitoring of the stock removal effected by each profile milling tool 14 of the set of profile machining tools 18 and/or the monitoring of the polishing pressure exerted by each profile polishing tool 16 of the set of profile machining tools 18.

In at least one further method step 116 (which is an alternative to the method step 114) the profile coordinates 102 of the individual profile machining tools 10, 12, 48, 50, 52, 54, 56 of the set of profile machining tools 18, which were determined in the tool measuring steps 26, 34, 38, 40, 42, 44, 46 and which were stored in the tool presetting steps 30, 36, 58, 60, 62, 64, 66, are overlaid with an offset 68 (see also FIGS. 6a to 6c), wherein the offset 68 indicates a relative displacement of the profile coordinates 102 stored in the respective tool presetting steps 30, 36, 58, 60, 62, 64, 66 with respect to the profile coordinates 102 of the profile machining tool 12, 48, 50, 52, 54, 56 which were measured before, in particular directly before, or wherein the offset 68 indicates a relative displacement of the profile coordinates 102 stored in the respective tool presetting steps 30, 36, 58, 60, 62, 64, 66 with respect to the profile coordinates 102 of the first profile machining tool 10. Preferably, in the second to seventh tool presetting steps 36, 58, 60, 62, 64, 66 in each case the offset 68 is calculated directly and/or is applied to the respectively newly stored profile coordinates 102. Alternatively the offset 68 could also be applied to the stored profile coordinates 102 no earlier than after an execution of all tool measuring steps 26, 34, 38, 40, 42, 44, 46.

In at least one output step 72 the determined and respectively aligned profile coordinates 102 are transmitted to the machine tool 74 in a machine-readable form. An offset 68 assigned to one of the profile milling tools 14 of the set of profile machining tools 18 herein causes a dataset of the profiling milling tools 14 transmitted to the machine tool 74 comprising a virtually enlarged profile milling tool 14. In this way it is advantageously achievable that, with identical machine tool settings, the different profile milling tools 14 are automatically moved not fully up to the desired edge end position but each leave a material rest behind, which is then partly or completely removed by the following profile milling tool 14 of the set of profile machining tools 18. Only the dataset of the final (finest) profile milling tool 14 is free of an offset and hence travels up to the desired edge position, thus leaving no material protruding beyond the desired edge position. An offset 68 assigned to one of the profile polishing tools 16 of the set of profile machining tools 18 herein causes a dataset of the profile polishing tool 16 that is transmitted to the machine tool 74 comprising a virtually downscaled profile polishing tool 16. In this way it is advantageously achievable that, with identical machine tool settings, the different profile polishing tools 16 automatically exert polishing pressures of differing intensities. In at least one further method step 120 the stone slab 22 is successively machined by the profile machining tools 10, 12, 48, 50, 52, 54, 56. Herein one of the two following machining sequences is followed: Either: fourth profile machining tool 50, third profile machining tool 48, second profile machining tool 12, first profile machining tool 10, fifth profile machining tool 52, sixth profile machining tool 54, seventh profile machining tool 56; or: fourth profile machining tool 50, third profile machining tool 48, second profile machining tool 12, first profile machining tool 10, seventh profile machining tool 56, sixth profile machining tool 54, fifth profile machining tool 52. A set of profile machining tools 18 may also comprise any number of profile machining tools that differs from one and from seven.

FIGS. 6a to 6c in each case exemplarily show profile coordinates 102, 102', 102'', 102''' of profile machining tools 10, 12, 48, 50 identified on the basis of determined work contours 28. The profile coordinates 102, 102', 102'', 102''' are in each case overlaid with a contour, respectively with coordinates, of the stone slab 22 that is to be machined. The profile coordinates 102, 102', 102'', 102''' are in each case automatically aligned relative to the stone slab 22 that is to be machined, in particular to the coordinates of the stone slab 22 that is to be machined. For the alignment of the profile coordinates 102, 102', 102'', 102''' relative to the stone slab 22, in each case a point of the work contour 28 of the profile machining tool 10, which was measured in the first tool measuring step 26, is determined in which the work contour 28 takes on a maximum curvature radius. In this way it is advantageously achievable that in a machining of the stone slab 22 by successive profile machining tools 10, 12, 48, 50, 52, 54, 56, the at least partly and/or at least section-wise concave work contours 28 are aligned relative to one another as precisely as possible (i. e. that they are superimposed to one another, except for the offset 86).

The profile coordinates 102 of the first profile machining tool 10, i. e. of the profile milling tool 14 with the finest grit, which is shown in all three FIGS. 6a to 6c, indicate the desired edge position. In FIG. 6a furthermore the profile coordinates 102' (displaced by the offset 68) of the second profile milling tool 12, i. e. of the profile milling tool 14 with the second-finest grit, are shown. The setoff between the profile coordinates 102 of the first profile machining tool 10 and the profile coordinates 102' of the second profile machining tool 12 is given by the offset 68. The offset 68 causes a displacement of the profile coordinates 102' in a direction that is parallel to a main extension plane 70 of the stone slab 22 that is to be machined.

In the case shown in FIG. 6a the offset 68 of a profile milling tool 14 is shown. The offset 68 assigned to a profile machining tool 12, 48, 50, embodied as a profile milling tool 14, of the set of profile machining tools 18 corresponds to a given (for example by the manufacturer) ideal stock removal value of this profile machining tool 12, 48, 50, in particular this profile milling tool 14. Ideal stock removal values of profile milling tools 14 are generally between 0.5 mm and 2 mm, preferably approximately 1 mm. The profile coordinates 102' of the second profile machining tool 12 are thus (virtually) displaced by an amount that corresponds to the ideal stock removal value of the second profile machining tool 12. This is in particular equivalent to a virtual enlargement of the second profile machining tool 12, i. e. an increment of the measuring values of the second profile machining tool 12 by the offset 68 in the direction of the main extension plane 70 of the stone slab 22, respectively in an x-coordinate direction 118. The difference between the profile coordinates 102, 102' of the first profile machining tool 10 and the second profile machining tool 12 thus approximately corresponds to a material region of the stone slab 22 which has been left over after machining of the stone slab 22 with the second profile machining tool 12 (and before that with the third and fourth profile machining tools 48, 50) and which must still be removed by the first profile machining tool 10.

In the case shown in FIG. 6b the offset 68 of another profile machining tool 14 of the set of profile machining tools 18, more precisely of the third profile machining tool 48, is shown. The profile coordinates 102'' of the third profile machining tool 48 are (virtually) displaced by an amount of a sum of the ideal stock removal value of the second profile machining tool 12 and the ideal stock removal value of the third profile machining tool 48. This is in particular equivalent to a virtual enlargement of the third profile machining tool 48 in the x-coordinate direction 118, which even exceeds the virtual enlargement of the second profile machining tool 12. The difference between the profile coordinates 102', 102'' of the second profile machining tool 12 and the third profile machining tool 48 thus approximately corresponds to a material region of the stone slab 22 that has been left over after machining the stone slab 22 with the third profile machining tool 48 (and before that with the fourth profile machining tool 50) and which must still be removed by the first profile machining tool 10 and by the second profile machining tool 12.

In the case shown in FIG. 6c the offset 68 of a profile polishing tool 16 of the set of profile machining tools 18, more precisely of the fifth profile machining tool 51, is shown. The offset 68 assigned to a profile polishing tool 16 has a direction that is opposed to a direction of the offset 68 assigned to a profile milling tool 14. The profile coordinates 102''' of the fifth profile machining tool 52 are (virtually) displaced counter to the x-coordinate direction 118. This is in particular equivalent to a virtual downscaling of the fifth profile machining tool 52 in the x-coordinate direction 118. This virtual downscaling results in a pressing of the profile polishing tool 16 to the stone slab 22. The difference between the profile coordinates 102, 102''' of the first profile machining tool 12 and the fifth profile machining tool 52 thus approximately corresponds to a compression which a polishing material of the profile polishing tool 16 is subjected to by the pressing to the stone slab 22.

REFERENCE NUMERALS 10 first profile machining tool
12 second profile machining tool
14 profile milling tool
16 profile polishing tool
18 set of profile machining tools
20 side edge
22 stone slab
24 tool presetting and/or tool measuring apparatus
26 first tool measuring step
28 work contour
30 first tool presetting step
32 memory unit
34 second tool measuring step
36 second tool presetting step
38 third tool measuring step
40 fourth tool measuring step
42 fifth tool measuring step
44 sixth tool measuring step 46 seventh tool measuring step
48 third profile machining tool
50 fourth profile machining tool
52 fifth profile machining tool
54 sixth profile machining tool
56 seventh profile machining tool
58 third tool presetting step
60 fourth tool presetting step
62 fifth tool presetting step
64 sixth tool presetting step
66 seventh tool presetting step
68 offset
70 main extension plane
72 output step
74 machine tool
76 optical measuring device
78 camera
80 lighting
82 polishing surface
84 machining surface
86 edge shape
88 holding device
90 control and/or regulation unit
92 processor
94 method step
96 spindle unit
98 tool receiving region
100 method step
102 profile coordinates
104 method step
106 method step
108 method step
110 method step
112 method step
114 method step
116 method step
118 x-coordinate direction
120 method step
122 rotation axis

The invention claimed is:

1. An optical measuring and presetting method for a combined measuring and presetting of a set of profile machining tools comprising a plurality of individual profile machining tools, wherein the individual profile machining tools of the set of profile machining tools are configured for a successive machining of side edges of stone slabs, with at least one tool presetting and tool measuring apparatus, having an optical measuring device with a camera, wherein by means of the tool presetting and tool measuring apparatus in at least one first tool measuring step an at least partly and/or at least section-wise concave-curved work contour of a first profile machining tool of the set of profile machining tools is optically captured in an at least partially automated manner, wherein in a first tool presetting step profile coordinates are assigned to the work contour of the first profile machining tool captured in the first tool measuring step, said profile coordinates being stored in a memory unit of the tool presetting and tool measuring apparatus, wherein in at least one second tool measuring step an at least partly and/or at least section-wise concave work contour of a second profile machining tool of the set of profile machining tools is optically captured in an at least partially automated manner by the tool presetting and tool measuring apparatus, wherein in at least one second tool presetting step the profile coordinates of the second profile machining tool determined in the second tool measuring step are aligned with the profile coordinates of the first profile machining tool which were previously determined in the first tool measuring step, wherein in the second tool presetting step the profile coordinates of the work contour of the first profile machining tool are inputted as reference coordinates for a relative positioning of profile coordinates of the captured work contour of the second profile machining tool, and are stored in the memory unit of the tool presetting and tool measuring apparatus, and wherein the profile coordinates are configured to be output to a machine tool which, on the basis of those profile data, machines the stone slab with the profile machining tools successively.

2. The measuring and presetting method according to claim 1, comprising at least five further tool measuring steps, in which at least partly concave and/or at least section-wise concave work contours of at least five further profile machining tools of the set of profile machining tools are optically captured in an at least partially automated manner, wherein in each of the further tool measuring steps the profile coordinates of the further profile machining tools determined therein are, in each case in at least one allocated further tool presetting step, aligned with the profile coordinates of one of the previously measured further profile machining tools, which were determined in the preceding tool measuring step.

3. The measuring and presetting method according to claim 1, wherein in the combined measuring and presetting of the plurality of individual profile machining tools of the set of profile machining tools, in at least one tool measuring step a profile milling tool is optically measured, and in at least one tool measuring step, which follows said tool measuring step, a profile polishing tool is optically measured.

4. The measuring and presetting method according to claim 1, wherein in the combined measuring and presetting of the plurality of individual profile machining tools of the set of profile machining tools, in at least one tool measuring step, a profile milling tool is optically measured, and in at least one tool measuring step, which follows said tool measuring step, a profile polishing tool is optically measured and that in a tool presetting step, which follows the tool measuring step in which the profile polishing tool was measured and which is allocated to the profile polishing tool measured in the tool measuring step, the determined profile coordinates of the profile polishing tool are aligned with the profile coordinates of the first profile machining tool embodied as a profile milling tool, which were previously determined in the first tool measuring step.

5. The measuring and presetting method according to claim 1, wherein at least a plurality of the profile machining tools which are to be measured, of the set of profile machining tools, are profile milling tools, wherein in the first tool measuring step of the combined measuring and presetting of the plurality of individual profile machining tools of the set of profile machining tools, which is executed on a profile milling tool, the profile milling tool of the set of profile machining tools which has the least coarse machining surface is measured, and that the profile milling tools that are to be measured in the following tool measuring steps are sorted in ascending order by a coarseness of the machining surfaces of the profile milling tools.

6. The measuring and presetting method according to claim 1, wherein at least a plurality of the profile machining tools which are to be measured, of the set of profile machining tools, are profile polishing tools, and wherein at least a plurality of the profile machining tools which are to be measured, of the set of profile machining tools, are profile milling tools, wherein first at least one of the profile milling tools of the set of profile machining tools is measured and preset before one or several profile polishing tool/s of the set of profile machining tools is/are measured and preset.

7. The measuring and presetting method according to claim 1, wherein at least a plurality of the profile machining tools which are to be measured, of the set of profile machining tools, are profile polishing tools, wherein the profile coordinates determined in tool measuring steps on profile polishing tools of the set of profile machining tools are in each case aligned with the determined profile coordinates of the profile milling tool of the set of profile machining tools which has the finest machining surface with the finest grit.

8. The measuring and presetting method according to claim 1, wherein the profile coordinates stored in the tool presetting steps are overlaid with coordinates of a side edge of a stone slab, which is to be machined.

9. The measuring and presetting method according to claim 8, wherein the profile coordinates of the individual profile machining tools of the set of profile machining tools, which were determined in the tool measuring steps, are overlaid as precisely as possible in the tool presetting steps.

10. The measuring and presetting method according to claim 8, wherein the profile coordinates of the individual profile machining tools of the set of profile machining tools, which were determined in the tool measuring steps are overlaid with an offset in the tool presetting steps.

11. The measuring and presetting method according to claim 10, wherein the offset induces a displacement of the profile coordinates in a direction that is parallel to a main extension plane of the stone slab which is to be machined.

12. The measuring and presetting method according to claim 10, wherein an offset assigned to at least one of the profile machining tools, which are embodied as profile milling tools, of the set of machining tools is adjusted relative to the determined profile coordinates of the profile milling tool of the set of profile machining tools, which was measured previously.

13. The measuring and presetting method according to claim 10, wherein an offset assigned to at least one of the profile machining tools, which are embodied as profile milling tools, of the set of profile machining tools corresponds to a manufacturer-specified ideal stock removal value of this profile milling tool.

14. The measuring and presetting method according to claim 10, wherein an offset assigned to at least one of the profile machining tools of the set of profile machining tools is adjusted relative to the determined profile coordinates of the previously measured profile milling tool of the set of profile machining tools, which has the machining surface with the finest grit of all profile milling tools of the set of profile machining tools.

15. The measuring and presetting method according to claim 14, wherein an offset assigned to at least one of the profile machining tools, which are embodied as profile milling tools, of the set of machining tools is adjusted relative to the determined profile coordinates of the profile milling tool of the set of profile machining tools, which was measured previously, and that at least one offset assigned to a profile milling tool in a tool presetting step has a direction that is opposed to an offset assigned to a profile polishing tool in a further tool presetting step.

16. The measuring and presetting method according to claim 8 wherein at least the profile coordinates stored in the first tool presetting step are automatically aligned relative to the stone slab that is to be machined.

17. The measuring and presetting method according to claim 16, wherein for the alignment of the profile coordinates relative to the stone slab, a point of the work contour of the profile machining tool, measured in the first tool measuring step, is determined, in which the work contour takes on the maximum curvature radius along the work contour.

18. The measuring and presetting method according to claim 1, wherein in at least one output step the determined and respectively aligned profile coordinates are transmitted to a machine tool in a machine-readable form.

19. The measuring and presetting method according to claim 18, wherein the profile coordinates of the individual profile machining tools of the set of profile machining tools, which were determined in the tool measuring steps are overlaid with an offset in the tool presetting steps, and that an offset assigned to at least one of the profile milling tools of the set of profile machining tools causes a dataset with a virtually enlarged profile milling tool being transmitted to the machine tool.

20. The measuring and presetting method according to claim 18, wherein an offset assigned to at least one of the profile machining tools of the set of profile machining tools is adjusted relative to the determined profile coordinates of the previously measured profile milling tool of the set of profile machining tools, which has the finest machining surface with the finest grit of all profile milling tools of the set of profile machining tools and that an offset assigned to at least one of the profile polishing tools of the set of profile machining tools causes a dataset with a virtually downscaled profile polishing tool being transmitted to the machine tool.

21. An optical tool presetting and tool measuring apparatus for an execution of the optical measuring and presetting method according to claim 1.

22. The measuring and presetting method according to claim 1, wherein the some of the individual profile machining tools of the plurality of profile machining tools are embodied as profile milling tools and wherein some others of the individual profile machining tools of the plurality of profile machining tools are embodied as profile polishing tools.

23. The measuring and presetting method according to claim 22, wherein the profile milling tools are profiling wheels and wherein the profile polishing tools are profile polishing wheels.

* * * * *